ic Office 2,849,304
Patented Aug. 26, 1958

2,849,304

ANTIKNOCK COMPOSITIONS

Raymond G. Lyben, Detroit, Mich., assignor to Ethyl Corporation, New York, N. Y., a corporation of Delaware No Drawing. Application May 31, 1955
Serial No. 512,287

7 Claims. (Cl. 44—69)

This invention relates to improved antiknock compositions. These compositions encompass antiknock fluids and leaded fuels. In particular, this invention relates to a class of halogen- and oxygen-containing hydrocarbons having a particular molecular structure for use as a scavenger with lead antiknock compounds.

With the discovery of the antiknock effectiveness of organolead compounds, in particular alkyllead compounds such as tetraethyllead, it was found that for efficient operation of the engine, means must be provided to remove the lead-containing products of combustion. The first advance in this art was the discovery that certain organic halogen compounds, in particular organic chlorides and bromides, when co-present with the lead antiknock compound, reacted in the combustion chamber with the combustion products of the lead antiknock to form volatile lead halides. These lead halides during the exhaust cycle were more or less efficiently removed from the combustion chamber. This process has been called scavenging, and a material capable of so reacting with lead is referred to as a lead scavenger or, more simply, as a scavenger. Choice of a commercial scavenger to date has been based on commercial availability and cost. Thus, up to the present the only scavengers which have enjoyed any commercial success have been ethylene dibromide and ethylene dichloride. Other halogen-containing compounds proposed as scavengers were those which can be introduced into the combustion chambers of the various cylinders of a multi-cylinder engine in the same proportionate ratio as the tetraethyllead. This can be achieved by employing scavengers which have approximately the same relative volatility in the fuel as the tetraethyllead. These scavengers are known as uniformly volatile scavengers. As before, no consideration was given to chemical or physico-chemical properties as they affect the scavenging function.

It is, therefore, an object of this invention to provide antiknock compositions having improved scavenging properties. It is also an object of this invention to provide antiknock fluids containing improved scavengers. It is likewise an object of this invention to provide fuels containing lead antiknock agents and improved scavengers. It is a further object of this invention to provide means for operating an internal combustion engine with leaded fuels in a manner wherein the advantages of the lead antiknock are utilized to a maximum degree and the disadvantages are minimized. These and other objects of this invention will become apparent from the following description.

The above and other objects are accomplished by providing organolead-containing antiknock fluids and fuels containing halogenated organic compounds as scavengers wherein at least one mole percent of the halogen is present in the form of aliphatic open-chain halohydrin compounds having 1 to 4 OH groups and 1 to 6 halogens in which the halogens have atomic weights of 35 to 81 and at least one of the halogens in the halohydrin is attached to a carbon atom which is not more than two carbons removed from an OH-bearing carbon. The reason for the restriction on the relative locations of the halogen and OH groups is that it has been found that when more than one carbon atom separate the halogen-bearing carbon and the carbon to which the OH group is attached, no improvement in scavenger effectiveness over conventional scavengers is observed. The aliphatic halohydrocarbon scavengers of this invention possess the required engine inductibility and stability characteristics in addition to enhanced scavenging effectiveness. The term halohydrin is used herein to describe carbon-, oxygen-, hydrogen-, and halogen-containing compounds which have at least one halogen and at least one hydroxy group attached to aliphatic carbon atoms. That is, it is a halogen- and an OH-group-containing open-chain aliphatic compound. The halohydrins used as scavengers according to this invention have the general formula

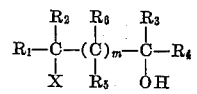

wherein $m$ is not greater than one, that is, it can be zero or one; X is a halogen of atomic weight 35–81, i. e., chlorine or bromine. The R's can be the same or different and can be hydrogen or an aliphatic radical containing from 1 to 18 carbon atoms, preferably 1 to 10 carbon atoms, 0 to 3 OH groups and/or 0 to 5 halogens of atomic weight 35–81. The aliphatic radical can be saturated or unsaturated, that is, the radical can contain one or more units of carbon-to-carbon double and/or triple bonds. By aliphatic radical is meant an open-chain carbon and hydrogen-containing radical. The radical can have the general formula $$C_nX_r(OH)_sH_{(2n+1)-(s+r+2d+4t)}$$

wherein $n$ and X are the same as above; $s$ can be a number from 0 to 3, preferably 0 to 1; $r$ can be a number from 0 to 5, preferably 0 to 1; $d$ is the number of double bonds and can vary from 0 to 2, preferably 0 to 1; and $t$ represents the number of triple bonds and can likewise vary from 0 to 2, preferably 0 to 1. Therefore, the sum $s+d+t$ can vary from 0 to 12, preferably 0 to 2 with $s$ and $r$ each varying from 0 to 1 and $d$ and $t$ each equal to zero.

The novel scavenging agents of this invention are chlorohydrins and bromohydrins and can be derived from alkanes and alkenes. The lowest hydrocarbon radical which can provide a scavenger of this invention contains two carbon atoms, namely, 1-halo-2-hydroxyethane. In order to provide scavengers having the proper inductibility characteristics with respect to induction into the combustion chamber of a spark-ignition engine through the fuel lines of conventional commercial engines, I employ halohydrin scavengers having from 2 to 20 carbon atoms, 1 to 6 halogens and 1 to 4 OH groups per molecule. A preferred embodiment of my invention comprises halohydrin compounds having from 2 to 12 carbon atoms, 1 to 4 halogens and 1 to 2 OH groups, as they have more favorable inductibility characteristics. An especially preferred class of halohydrin scavengers which have a minimum of water solubility and a maximum solubility in hydrocarbon fuels are compounds having 5 to 12 carbon atoms, 1 to 2 OH groups and 1 to 2 halogens. In the scavengers of this invention the ratio of halogen to OH groups can vary from 1:4 to about 6:1 and higher, the requirement being that at least one of the halogens is on a carbon atom which is not more than two carbons removed from an OH-bearing carbon. A preferred halogen-to-OH group ratio is from 1:1 to about 4:1, as compounds within this class are found to have favorable induction characteristics. For greater scavenging effectiveness per unit halogen, I prefer halohydrins having not more than two halogens at least one of which is attached to carbon atoms which are not further removed than two carbons from the OH-bearing carbon. I especially prefer halohydrins having a halogen-to-OH ratio of 1:1 in which the halogen is on the carbon atom alpha to the OH-bearing carbon.

As stated hereinabove, improved scavenging effectiveness is obtained when a halohydrin compound has a halogen atom attached to a carbon atom which is not more than two carbons removed from the OH-bearing carbon. However, there may be other bromine or chlorine atoms attached to other carbon atoms. While the latter halogens exhibit only ordinary lead-scavenging properties, the compound as a whole possesses scavenging ability which is an improvement over conventional scavengers. In fact, a halohydrin which has halogen atoms attached to carbon atoms not more than two carbons removed from the OH-bearing carbon and also has halogens attached to other carbon atoms, possesses the advantage of combined effectiveness of an OH-activated halogen and a halogen of a prior art halohydrocarbon in one compound. Such compounds are also within this invention.

Thus, in general, my invention comprises providing lead antiknock fluids and fuels containing halogenated organic compounds as scavengers wherein at least one mole percent of halogen in the scavenger compounds is present in the form of halohydrins having from 2 to 20 carbon atoms, 1 to 4 hydroxy groups and about 1 to 6 halogens which have atomic weights of 35 to 81, at least one of said halogens being located on a carbon atom which is not more than two carbons removed from an OH-bearing carbon.

With all halogen scavengers, the scavenging effect is achieved by decomposition of the scavenger to form hydrogen halide which then reacts at some point in the combustion cycle with the decomposition product of the lead antiknock compound to form volatile lead halide. Previously known scavengers produce such hydrogen halide only during or after the advance of the flame front. The scavengers of this invention achieve their enhanced effectiveness because they produce the hydrogen halide not only during and after the advance of the flame front but, more significantly, before the passing of the flame front. It has been established that lead antiknock compounds exert their effectiveness by the production in the combustion chamber of a fog of non-halogenated inorganic lead, which is probably lead oxide. This lead oxide fog not only is produced before the advance of the flame front but also exerts its influence on knock-inducing components of the combustion chamber gases prior to their combustion in the flame front. The duration of the effectiveness of these antiknock particles is short because they agglomerate rapidly and the amount of surface exposed to the reactive fuel-air mixture drops off. For best results, the active scavenging chemical, hydrogen halide, should be available shortly after the lead oxide particles have exerted their antiknock effect but before they have agglomerated into large particles or deposited on the walls of the combustion chamber. In order to accomplish this, the scavengers must have a rate of decomposition which is closely related to the decomposition rate of tetraethyllead. Thus, there is a supply of hydrogen halide available for reaction with the lead antiknock decomposition products shortly after they have performed their function as antiknocks. Hence, there is more time for reaction between hydrogen halides and the lead antiknock decomposition products under conditions most favorable to such reaction, namely, in the presence of large amounts of oxygen, before a given part of the mixture is consumed by the combustion flame. Because the compounds used as scavengers in this invention have a rate of decomposition which is closely related to that of tetraethyllead, they are called uniformly stable scavengers or, briefly, U. S. scavengers. Of course, any hydrogen halide liberated by the scavenger before the flame, but which has not reacted with the lead oxide at that time, will still be available for reaction after burning in the same manner as is accomplished by the conventional scavengers. It is for this reason that the scavengers of the instant invention are also called double-acting scavengers.

The scavenging composition of my new antiknock fluid mixtures can be described in terms of theories of halogen. A theory of halogen is defined as the amount of halogen which is necessary to react completely with the lead present in the antiknock mixture to convert it to lead dihalide. Thus, one theory of halogen represents two atoms of halogen for every atom of lead present.

The outstanding properties and unexpected advantages of my scavengers can be graphically illustrated by the following statement of results: Using a single cylinder test engine with isooctane fuel containing 13.2 grams of lead as tetraethyllead per gallon and 0.75 theory of bromine as 1-bromo-2-propanol, one of the scavengers of this invention, the amount of deposit on the exhaust valve was only 7 percent as compared with the amount of deposit formed when the same fuel was run through the same engine for the same time with no scavenger present. Thus, the amount of deposit removal was 93 percent. When a similar run was made with 0.75 theory of bromine as ethylene dibromide, a conventional scavenger, only 50 percent deposit removal was obtained as compared with the fuel containing lead but no scavenger. The relative effectiveness in deposit removal of my scavenger as compared to the conventional scavenger was therefore 186 percent.

In order to determine the effect of my new scavengers on exhaust valve life, a single cylinder test engine having a combustion chamber displacement of 17.6 cu. in. and a compression ratio of 5.6:1 is operated at 2700 R. P. M. on a fuel-to-air ratio of 0.07 using a commercial fuel containing 0.05 percent sulfur and 3 ml. of tetraethyllead per gallon together with various halogen compounds as scavengers. When the scavenger is composed of 0.3 theory of bromine as ethylene dibromide, 1.0 theory of chlorine as ethylene dichloride, and 0.2 theory of bromine as ethylene bromohydrin, the average number of hours of operation of the engine until the exhaust valve fails is considerably greater than when equivalent amounts of bromine and chlorine are employed in the form of ethylene dibromide and ethylene dichloride. Thus, it is seen that replacing part of the bromine contained as ethylene dibromide in a conventional scavenger containing 0.5 theory of bromine as ethylene dibromide and 1.0 theory of chlorine as ethylene dichloride (62 Mix) with an equivalent amount of bromine in the form of one of the compounds of this invention results in a substantial increase in valve life.

Another completely novel and unexpected advantage of the present scavengers is the fact that when used in relatively low concentrations, they actually enhance the antiknock effectiveness of tetraethyllead and other organolead antiknock agents. For example, when a single cylinder test engine was operated on a primary reference fuel of 80 octane number containing 3.02 grams of lead as tetraethyllead per gallon and 0.25 theory of bromie as 1-bromo-2-propanol, a new scavenger of this invention, an actual increase of 3 percent in the antiknock effectiveness of the tertaethyllead was observed. That is, the antiknock action of the fuel blended with the new scavenger was equal to the antiknock action that could be achieved by adding an additional 3 percent of tetraethyllead to the fuel used. In like maner, 0.5 theory of bromine as 1-bromo-2-propanol increased the tetraethyllead antiknock eflectiveness by 4 percent. This lead antiknock enhancement effect is shown by the other halohydrin compounds of this invention, such as ethylene bromohydrin, ethylene chlorohydrin, 2-bromohexanol, and the like.

The halohydrin compounds employed as scavengers according to this invention can be broadly classified into two categories, one consisting of compounds having a halogen-to-OH ratio of 1:1 and the other class having a halogen-to-OH ratio greater than one. These classes can be further subdivided into groups of compounds, one of which consists of halohydrins having 2 to 12 carbon atoms in the molecule and the other group having from 13 to 20 carbon atoms per molecule.

Typical halohydrin compounds in which the halogen-to-OH ratio is 1:1 are ethylene bromohydrin, ethylene chlorohydrin, 1-bromo-2-propanol, 3-chloropropanol, 2-bromo-2-methylpropanol, 1-chloro-2-methyl-2-propanol, 2-chlorohexanol, 3-bromo-5-methylhexanol, 2,4-dibromo-1,5-pentanediol, 1-chloro-5-bromo-2,4-dimethyl-2,4-pentanediol, and 1,3,7,10-tetrahydroxy-2,2,5,9-tetrachlorodecane, which illustrate compounds of this invention having from 2 to 12 carbon atoms; and 2-bromo-tetradecanol, 4-chloro-2-hexadecanol, 3-bromo-3-methylnonadecanol, 1,5-dihydroxy-2,4-dibromo-7-ethyldecane, 1,3,5-trihydroxy-2,4,6-trichlorooctadecane, and the like, which are non-limiting examples of halohydrins having from 13 to 20 carbon atoms.

Non-limiting examples of halohydrins in which the halogen-to-OH ratio is greater than one are 1,1-dibromo-2-hydroxyethane; 1-chloro-1-bromo-2-hydroxyethane; 1,1-dichloro-2-hydroxy-2-methylpropane; 1,3-dibromo-2-hydroxy-2-methylpropane; 1-bromo-4-chloro-2-hydroxy-2-methylbutane; 1,5 - dibromo - 3 - hydroxypentane; 2,3-dichlorohexanol; 3,3-dibromopropanol; 2,3-dichlorohexanol; 2,3,5-tribromo-1,6-hexanediol; 1,1,1-trichloro-2-hydroxyethane; 1,1-dichloro-3,3-dibromo-2-propanol; 1,1,1-trichloro-2-methyl-2-propanol; 1,1,1,4-tetrabromo-2-butanol; 1,2,4,5-tetrabromo-2,3,4,5-tetramethyl-3-hexanol; 2,4,6-trichlorohexanol, which represent compounds of this invention having 2 to 12 carbon atoms; and 1-bromo-3-chloro-2-octadecanol; 1,2,4-tribromo-3-tetradecanol; 2,2-dichloro - 3,4 - dibromohexadecanol; 5,5,6,8,9,11-hexachloro-7,10-dihydroxyeicosane, and the like, which illustrate halohydrins having from 13 to 20 carbon atoms.

While in the examples of halohydrin compounds given above the alkyl portions of the molecule were saturated, it is nevertheless possible to employ halohydrins having olefinic unsaturation therein. Non-limiting examples of such compounds are 5-bromo-4-hydroxypentene-1; 3-chloro-4-hydroxyhexene-1; 6,6,6-trichloro - 5 - hydroxyhexene-1; 1-bromo-7-chloro-8-hydroxyoctene-2, and the like.

As stated above, the halohydrin scavengers of this invention can have halogens at any position within the molecule, provided that at least one halogen is not more than two carbon atoms removed from the OH-bearing carbon. When halohydrins, which have halogens on carbons not further than two carbon atoms removed from the OH-group, as well as halogens further removed, are employed, they serve the dual function of providing hydrohalic acids for scavenging lead oxide products before the advance of the flame front through the combustion chamber, as well as providing a substantial supply of halogen for scavenging purposes in the flame front and after the passage of the flame. Thus, it is seen that scavengers of this invention can be tailor-made to provide compounds containing various combinations of the more effective uniformly stable scavenging components of this invention together with the less reactive scavenging components of the prior art type. This constitutes another embodiment of my invention. Illustrative examples of such dual purpose compounds are 2,5-dibromopentanol, 2,7-dichloro-3-methyl-3-octanol, and the like.

The halohydrins used in this invention can be made by a number of methods, as, for example, by the reaction of HCl or HBr with epoxy compounds. An illustration of this is the reaction of HBr with ethylene epoxide to produce 2-bromo-1-ethanol. Compounds, such as 1-bromo-3-butanol, in which the halogen-bearing carbon and the carbon to which the hydroxy group is attached are separated by one carbon atom, can be made by similar methods. Other methods of synthesis of halohydrin compounds include partial hydrolysis of polyhalides, reaction of hydrogen halides with polyhydroxy compounds, and addition of HOX to olefins. Still other routes to the synthesis of halohydrin compounds will be apparent to those skilled in the art.

It has been found that the scavengers of this invention can be used in several different formulation or blend types. Principal among these are (a) blends or fluids in which my scavengers are the sole scavenging agents, (b) fluids in which the scavengers are added to conventional antiknock fluids to supplement the scavengers therein, and (c) those in which the scavengers replace a portion of the scavenger in a conventional antiknock fluid. The scavengers of this invention can in general be used in admixture with other scavengers in any proportion within the limits of the amounts of scavenger employed in my antiknock fluids as stated below. Furthermore, mixtures of my scavengers can be so used as well as individual scavengers.

My scavengers can be employed together with any other scavenging agent or mixture of two or more of them. For example, the polyhalohydrin compounds of this invention can be added to organolead antiknock fluids containing 0.5 theory of bromine as ethylene dibromide and 1.0 theory of chlorine as ethylene dichloride or any combination of theories of these two components as, for example, those described in U. S. Patent 2,398,281. The halohydrin compounds can also be employed with one theory of bromine as ethylene dibromide or amounts of the latter either greater or less than one theory. Other scavenger compositions that can be employed together with the halohydrin compounds are those having a vapor pressure of substantially 0.2 to 6 mm. of mercury at 50° C. as, for example, the compositions described in U. S. Patents 2,479,900; 2,479,901; and 2,479,903. My scavenging agents can likewise be used with compositions of the kind described in U. S. Patents 2,364,921, 2,479,902; 2,490,606; 2,496,983, etc. It is not intended that mixed scavenger fluids and fuels of this invention be limited to mixtures of my new scavenger with the above-mentioned conventional scavengers, but they may be employed together with any hydrocarbon fuel-soluble organic halide scavenger compounds consisting of carbon and elements selected from the group consisting of bromine, chlorine, hydrogen, nitrogen, and oxygen. In addition, my scavengers can be employed with deposit modifying compounds not containing halogens; for example, organo-phosphorus compounds and the like. In any event, a scavenger of this invention is always present so that the amount of halogen which it provides represents at least one mole percent of total halogen in the scavenger mixture.

In general, good results are obtained when the antiknock mixtures are so composed that the amount of halogen present ranges between 0.1 and 4.0 theories. This includes not only the amount of new scavenger but also the amount of prior art scavenger, if any, so that the above range applies to the total amount of halogen present in the antiknock fluid. For most outstanding results I prefer that the total amount of halogen be between 0.15 and 2.0 theories as at least 0.15 theory should be present to give best scavenging results, while not much additional scavenging benefit is obtained when more than 2.0 total theories are used.

Referring to the three principal blend types listed above, when I use type (a), in which my scavengers are the sole scavenging agents, I prefer to use between 0.1 and 2.0 theories of halogen. For the greatest benefit I use chlorohydrins to the extent of 0.3 to 1.5 theories and bromohydrins in amount between 0.15 and 0.75 theory. When a mixture of the chloride and bromide is used, the amount of each will vary according to a relationship which will be shown below.

When I employ either fluid type (b), a fluid in which my new scavengers are added to conventional antiknock fluids to supplement the scavengers therein, or fluid type (c), one in which my scavengers replace a portion of the scavenger in a conventional antiknock fluid, I adjust the amounts of scavenger compounds so that the total halogen is from 0.1 to 4.0 theories, preferably 0.15 to 2.0 theories, and the portion of this which is in the form of my novel scavenger ranges between 0.01 and 1.5 theories.

A preferred embodiment of my invention is to employ the halohydrins along with other scavenger compounds such as other halogen-containing compounds. When made use of in this manner, the halohydrins of the kind referred to hereinabove can be employed in concentrations at which they are found to be most effective. That is, the halohydrin compounds can be employed at concentrations at which they enhance the effect of the lead antiknock agent. When used with conventional and other prior art scavengers in this manner, the preferred concentrations of the halohydrins are in amounts up to about 1.5 theories of halogen based on the lead present. The total amount of halogen due to the various compounds in the scavenger mixture is governed by the equation which is discussed fully hereinbelow.

The advantage of using my uniformly stable scavengers with less reactive prior art scavengers is that the latter can be present to provide scavenging components during and after the passage of the flame front through the gases in the combustion chamber, while the former can be present in amount sufficient to provide active ingredients to act on the deposit forming particles soon after they are formed and have exerted their antiknock effect which is prior to the passing of the flame front, as well as providing scavenging components for action during and after the passage of the flame front. Thus, a combination of two or more different types of compounds, of which up to 1.5 theories consist of the halohydrin scavengers of this invention, constitutes a scavenging composition, the deposit minimizing effectiveness of which has not been attained before without bringing in some other deleterious results such as excessive corrosion, etc.

It has been found that the relative scavenging effectiveness of bromine-containing compounds and chlorine-containing compounds varies depending on the engine operating conditions. Thus, under light load operations, as in passenger car service when engine surface temperatures are low, the scavenging efficiency of chlorine-containing compounds is much lower than that of similar bromine-containing compounds. On the other hand, when the engine temperature is relatively high, as is the case in heavy-duty truck operation, the scavenging effectiveness of chlorine in the form of a chlorine-containing compound is considerably higher than under low temperature conditions, while the bromine-containing compounds show a trend in the opposite direction. Taking an over-all average over varying engine operating conditions, it may be said that chlorine in the form of a chlorine-containing compound is approximately one-half as effective in removing deposits from exhaust valves and spark plugs as an equivalent number of theories of bromine in the form of a similar bromine-containing compound. Accordingly, a convenient method for expressing the total number of theories of halogen in a lead-containing antiknock fluid or fuel is in terms of the scavenging effectiveness of bromine. For example, since a chlorine-containing compound is on the average only about one-half as effective a scavenger as a similar bromine-containing compound, it will require about twice as many equivalents of the chloro compound to obtain the same deposit removing effect as of a given amount of a bromine compound. In this regard it should be pointed out that I use the upper limit of 4.0 theories of scavenger when employing only chlorine-containing scavengers, since the same amount of effectiveness is obtained with 2.0 theories of bromine; and by the same token I use the lower limit of 0.1 theory of scavenger when a bromine-containing scavenger is the sole scavenging constituent, since an equivalent amount of chlorine is 0.2 theory. Thus, if X is the number of theories in terms of bromine effectiveness required in a scavenging composition, it is convenient to determine the make-up of a desired fluid with respect to the proportions of chlorine scavenger and bromine scavenger by use of the equation $$\tfrac{1}{2}T_{Cl}+T_{Br}=X$$

In this equation $T_{Cl}$ represents the number of theories of chlorine and $T_{Br}$ represents the number of theories of bromine. The limits set for X correspond to the total bromine scavenging effectiveness desired. Therefore, X can range between 0.1 and 2.0. To determine the halogen-containing scavenger composition of a fluid or fuel by means of this equation, therefore, I first select the total number of theories of halogen in terms of bromine scavenging effectiveness desired and substitute this number for X in the equation. Then I select the number of theories of either chlorine or bromine which I wish to use. The equation is next solved for the remaining unknown. By this method the composition of the fluid is determined insofar as the scavenger is concerned.

To illustrate, for example, suppose that it is desired to make up a fluid whose effectiveness in terms of bromine scavenger is equal to 1.5 theories, and suppose further that it is desired to use 1.2 theories of chlorine scavenger in this fluid. Placing these numbers in the above equation, there is obtained the expression $$\tfrac{1}{2}(1.2)+T_{Br}=1.5$$

Solving this equation for $T_{Br}$, it is found that 0.9 theory of bromine scavenger should be used.

The values of X in the above equation can vary from 0.1 to 2.0. Therefore, the equation holds true for values of $T_{Cl}$ ranging from zero to 4.0, while the value of $T_{Br}$ changes from 2.0 to zero. When the new scavengers of this invention are the sole scavenging agents, the preferred range of values for X is 0.1 to 1.0 and the equation will then embody the range of values of the theories of halogen between the upper and lower limits that can be used as stated hereinabove.

The use of the novel scavengers of this invention either alone or in combination with other scavengers possesses a number of advantages in addition to those mentioned above. One advantage is that by using the scavengers of the instant invention the scavenging effect of conventional scavengers can be obtained with a much lower concentration of halogen based on the lead present. For example, the scavenger mixture consisting of one theory of chlorine as ethylene dichloride plus 0.35 theory of bromine as 1-bromo-2-propanol has essentially the same effect as a conventional scavenger consisting of 1.0 theory of chlorine as ethylene dichloride and 0.5 theory of bromine as ethylene dibromide (62 Mix). On the other hand, when a combination of conventional scavengers and the scavengers of the instant invention is employed in an amount such that the concentration of halogen is equivalent to that commercially in use at present, a greatly increased scavenging effect is obtained. An illustration of this is the substitution of a small amount of a halohydrin for the halogen compound of a conventional scavenger mixture to give, for example, an antiknock fluid which contains as scavengers 1.0 theory of chlorine as ethylene dichloride, 0.4 theory of bromine as ethylene dibromide, and 0.1 theory of bromine as 2-bromoethanol. This antiknock fluid when employed in gasoline in a spark-ignition engine shows a marked improvement in scavenging effect over the conventional mixture. It can readily be seen that by taking advantage of these various benefits a great deal of flexibility can be achieved in tailor-making fluids to meet any requirement.

In blending the antiknock fluids with fuels I regulate the amount of antiknock fluid so that the amount of lead present in the fuel varies between 0.02 and 13.2 grams per gallon. It is to be understood that I may obtain the finished fuels by blending the various ingredients of my antiknock fluids separately or in any subcombination with the fuels as well as blending the finished antiknock fluids with the fuels.

The following examples illustrate various antiknock fluids of this invention.

EXAMPLE I

Ninety-eight parts (1.0 theory) of ethylene dichloride, 94 parts (0.5 theory) of ethylene dibromide, and 7.5 parts (0.03 theory) of 2-bromoethanol are admixed with efficient stirring with 323 parts of tetraethyllead. This gives an antiknock fluid in which the conventional fluid commonly known as 62 Mix has been supplemented by one of the new scavengers.

To obtain a finished fuel, the above described fluid is blended with gasoline so that the amount of lead present is 0.5 gram per gallon. Use of this fuel in a single cylinder test engine results in a smaller amount of deposits in the combustion chamber than when equivalent amounts of bromine and chlorine are employed in the form of the ethylene dihalides.

EXAMPLE II

To 323 parts of tetraethyllead is added with good stirring 98 parts (1.0 theory) of ethylene dichloride, 75 parts (0.4 theory) of ethylene dibromide, and 13.9 parts (0.05 theory) of 1-bromo-2-propanol.

To obtain a finished fuel, the above fluid is blended with gasoline so that it is evenly distributed throughout the gasoline and so that the amount of lead present in the gasoline is 7.5 grams per gallon. When this fuel is used in the operation of a single cylinder aviation-type engine, it is found that even though the halogen content of the scavengers is lower than that commercially in use at present, no more deposits remain in the combustion chamber.

EXAMPLE III

To 379 parts of tetrapropyllead is added 27.8 parts (0.1 theory) of 1-bromo-2-propanol.

This is blended with gasoline in relative amounts so that the finished fuel contains 3.16 grams of lead per gallon. When this fuel is employed in the operation of a spark-fired internal combustion engine, it is found that the deposit scavenging effect of the halohydrin is about twice as high as of an equivalent amount of bromine in the form of a primary halide.

Valuable antiknock fluids are also obtained when Example III is repeated with the amounts varying so that the amount of bromine as scavengers is as high as 2.0 theories. For best results it is preferred to blend so that when a chlorohydrin is used, the amount ranges between 0.3 and 1.5 theories, and so that when a bromohydrin is used, the amount of scavenger varies between 0.15 and 0.75 theory. Examples of fluid compositions of this type are: a mixture of 323 parts of tetraethyllead and 32.7 parts (0.15 theory) of 1,3-dibromo-2-propanol; a fluid containing 323 parts of tetraethyllead to 268 parts (0.75 theory) of 2-bromohexanol; a composition which contains 323 parts of tetraethyllead and 48.3 parts (0.3 theory) of 2-chloroethanol; and a mixture of 323 parts of tetraethyllead and 405 parts (1.5 theories) of 1,3,5-trihydroxy-2,4,6-trichlorooctadecane. Each of these fluid compositions is blended with hydrocarbon fuels as indicated above to make up a finished fuel.

EXAMPLE IV

To 254 parts of toluene as a solvent containing a blue dye are added 5 parts of 2,6-di-tert-butyl-4-methylphenol, 323 parts of tetraethyllead, 117.5 parts (0.25 theory) of 3,4-dibromo-1,5-dihydroxytetradecane, and 77 parts (0.5 theory) of 6,6,6-trichloro-5-hydroxy-3,5-dimethylhexene-1. This provides an antiknock fluid wherein the new scavengers comprise the only scavengers present and wherein the total amount of halogen is 0.75 theory.

This fluid is admixed with gasoline so that the total amount of lead present, which is uniformly distributed throughout the fuel, is 4.22 grams per gallon. When operating road vehicles, it is found that the use of this fuel results in longer valve and spark plug life as well as a lower amount of deposit in the combustion chamber than when an equivalent amount of halogens is employed in the form of conventional scavengers.

I also make blends which consist of tetraethyllead plus two bromohydrins, tetraethyllead plus two chlorohydrins, and tetraethyllead plus a chlorine compound and a bromine compound different from those above as, for example, tetraethyllead with 0.3 theory of bromine as 2,4-dibromopentane-1,5-diol and 0.70 theory of bromine as 1-bromo-2-hydroxydodecane; tetraethyllead with 0.9 theory of chlorine as 1-chloro-2-methyl-2-propanol and 0.55 theory of chlorine as 2-chloroethanol-1; and tetraethyllead with 0.5 theory each of chlorine and bromine in the form of 1-chloro-5-bromo-2,4-dimethylpentane-2,4-diol.

EXAMPLE V

To 323 parts of tetraethyllead is added 188 parts (one theory) of ethylene dibromide and 28.7 parts (0.1 theory) of 1-bromo-2-propanol. This composition provides an antiknock fluid wherein the scavengers comprise in part a compound of this invention and the scavenger used in 1-T mix. The total amount of scavenger is equivalent to 1.1 theories of bromine based on the amount of lead present.

The above fluid is added to gasoline with appropriate agitation so that when uniformly distributed throughout the fuel, the concentration of the fluid is eqivalent to 2.0 grams of lead per gallon of fuel. The deposit scavenging effect of this scavenger mixture, when the fuel is employed in a commercial multi-cylinder engine, is considerably greater than when an equivalent amount of bromine is made use of in the form of ethylene dibromide.

In like manner, fluids and fuels are prepared containing tetraethyllead together with the scavengers mentioned above in this example. A variation of the scavenger mix used herein is to combine 1 to 0.1 theory of bromine as ethylene dibromide with from 0.01 to 1.5 theories of halogen as a halohydrin as, for example, a fluid containing 323 parts of tetraethyllead, 188 parts (1.0 theory) of ethylene dibromide, and 3.6 parts (0.01 theory) of 1-bromo-2,4-pentanediol; gasoline containing 177 parts (1.5 theories) of 1,1,1-trichloro-2-methyl-2-propanol and 97 parts (0.5 theory) of ethylene dibromide for every 323 parts of tetraethyllead.

EXAMPLE VI

To 351 parts of diethyldiisopropyllead is added 113 parts (0.6 theory) of ethylene dibromide and 100 parts (0.3 theory) of 2-bromopentanol, providing an antiknock fluid containing 0.9 theory of halogen based on the lead present.

This fluid is blended with fuel of the gasoline boiling range in amounts such that the concentration of lead is 2.6 grams of lead per gallon. The scavenging effectiveness of the halogen compounds in this fuel is found to be about the same or better than that of one theory of ethylene dibromide, while the corrosion effects have been considerably reduced.

Other fluid and fuel compositions are made up in which the amount of bromine as ethylene dibromide varies from 0.2 to 0.95 theory and the amount of halogen as the highly effective scavengers of this invention varies from 0.01 to 0.75 theory. Examples of such other scavengers that can be mixed with ethylene dibromide are illustrated by compositions such as 0.2 theory of bromine as ethylene dibromide together with 0.75 theory of bromine as 2-bromo-heptanol-1; 0.6 theory of bromine as ethylene dibromide and 0.3 theory of chlorine as 1,3-dichloro-2,4,6,8-tetrahydroxyhexadecane, and the like.

EXAMPLE VII

To 419 parts of diphenyldiethyllead is added 69.6 parts (0.3 theory) of 1,1-dibromo-2-methyl-2-propanol and 765 parts (3.7 theories) of 1,2,3-tribromopentane. This constitutes an antiknock fluid wherein the scavenger consists of two components, one of which has the new scavenger of this invention and the other is a member of the class known as uniformly volatile or U. V. scavengers.

The antiknock fluid is blended with fuel of the gasoline boiling range in amount such that the concentration of lead is 5.0 grams per gallon. The scavenger mixture employed herein has the advantage of a combination of a halogen compound which has a volatility closely related to that of the lead compound so as to be distributed in the various cylinders of a multi-cylinder engine in about the same relative proportions as the lead antiknock agent, and also a scavenger which has a rate of decomposition of the same order of magnitude as that of the lead compound. This results in less deposits as well as longer spark plug and valve life than a mix using conventional scavengers.

Other combinations that can be employed using the very effective compounds of this invention and the uniformly volatile compounds of the type described in U. S. 2,479,900 are: 1.2 theories of chlorine as 2-chloro-5-ethyloctanol and 0.8 theory of bromine as 6-bromo-4-(bromoethyl)heptene-1; 1.5 theories of bromine as 3-bromo-4-eicosanol and 0.2 theory of bromine as 5,6-dibromo-3,3-dimethylhexane, etc.

EXAMPLE VIII

To 323 parts of tetraethyllead is added 18.1 parts (0.05 theory) of 1-bromo-2-hexanol and 437 parts (2.90 theories) of 4-chloro-1-($\beta$-chloroethyl)benzene. This provides an antiknock fluid wherein a scavenger of this invention is employed together with a U. V. scavenger of the type embodied in U. S. 2,479,901, of which the latter is a monohaloalkyl benzene compound having 8 carbon atoms with a chlorine attached to the benzene ring and having a vapor pressure in the range of from 0.2 to 6.0 mm. of mercury at 50° C.

This antiknock fluid is mixed with gasoline in proportions to give a concentration of 0.02 gram of lead per gallon of the fuel. I also make blends of fluids and fuels containing tetraethyllead and a mixture of the uniformly volatile scavengers together with compounds of this invention. Examples of these are tetraethyllead with 0.5 theory of chlorine as 1-chloro-2-hexanol and 3.5 theories of chlorine as mixed dichloroxylenes; 0.01 theory of bromine as 2,3,4,5-tetrabromopentanol and 0.14 theory of bromine as 2-bromo-1,3-dimethylbenzene with tetraethyllead, and the like. Fuels containing these scavenger mixes give engine operating characteristics similar to those obtained by the use of fuels blended as in Example VII.

EXAMPLE IX

To 267 parts of tetramethyllead in 200 parts of kerosene containing a dye and a small amount of a commercial antioxidant are added 327.8 parts (0.75 theory) of 2-chloro-6-dodecanol and 126 parts (1.0 theory) of 3,4,6-trichloro-1,2-dimethylbenzene. This results in an antiknock fluid wherein the scavengers of this invention are employed together with uniformly volatile scavengers of the kind embodied in U. S. 2,479,903.

To make up a fuel for internal combustion spark-ignition engines, the above fluid is blended with hydrocarbons of the gasoline boiling range in proportions such that the concentration of lead is 3.1 grams of lead per gallon. This fuel gives performance characteristics similar to the fuels of Examples VII and VIII.

Blends of fluids and fuels are also made up wherein the lead compound is dimethyldiethyllead and the scavengers comprise such combinations as 0.1 theory of bromine as 2-bromo-3-methylhexanol and 1.8 theories of chlorine as 1,2,3-trichlorobenzene; and 0.6 theory of chlorine as 2-chloro-2,4,4,6-tetramethyloctanol and 1.5 theories of chlorine as 3,4-dichlorocumene. The uniformly volatile scavengers used herein have a vapor pressure in the range of 0.2 to 6.0 mm. of mercury at 50° C.

EXAMPLE X

To 323 parts of tetraethyllead is added 94 parts (0.5 theory) of ethylene dibromide, 99 parts (1.0 theory) of ethylene dichloride, and 13.9 parts (0.05 theory) of 1-bromo-2-propanol. The antiknock fluid thus prepared is then blended with a fuel of the gasoline boiling range in amount such that the concentration of lead is 3.17 grams of lead per gallon. The deposit scavenging effect of the halogen compounds when this fuel is employed in a multi-cylinder engine is found to be greater than of a fuel in which an equivalent amount of halogen is present as ethylene dihalides only.

Other compositions are also prepared in which the amount of scavenger in the fluid and/or fuel, based on the amount of lead present, is illustrated by compositions such as 0.5 theory of bromine as ethylene dibromide, 1.0 theory of chlorine as ethylene dichloride, and 0.1 theory of chlorine in the form of 2-chloro-3-methylbutanol; and 0.5 theory of bromine as ethylene dibromide, 1.0 theory of chlorine as ethylene dichloride, together with 0.03 theory of bromine as 2-bromo-3-methylhexanol and 0.04 theory of chlorine as 2-chlorobutanol.

EXAMPLE XI

To 323 parts of tetraethyllead is added 47 parts (0.25 theory) of ethylene dibromide, 99 parts (1.0 theory) of ethylene dichloride, and 62.5 parts (0.250 theory) of 2-bromoethanol-1. The fluid thus prepared is blended with hydrocarbons of the gasoline fuel boiling range in amount such as to give a concentration of 2.8 grams of lead per gallon. This fuel, although it has the same halogen content as 62 Mix, nevertheless displays a more efficient scavenging effectiveness.

In like manner, antiknock fluid and fuel compositions are prepared in which the scavenger compositions are 0.45 theory of bromine as ethylene dibromide, 1.0 theory of chlorine as ethylene dichloride, and 0.075 theory of bromine as 1,3-dibromo-2-propanol; and 0.9 theory of bromine as ethylene dibromide, 0.6 theory of chlorine as ethylene dichloride, and 0.05 theory of bromine in the form of 1,1,1,3,5,7-hexabromo-2-hydroxy-4,4,6,8-tetramethyldecene-10.

EXAMPLE XII

To 323 parts of tetraethyllead is added 75.5 parts (0.25 theory) of 2-bromo-2-methylbutane and 62.5 parts (0.25 theory) of 2-bromoethanol-1. This mixture is thoroughly agitated to insure even distribution of the scavenger in the tetraethyllead fluid. The fluid is then blended with a hydrocarbon fuel of the gasoline boiling range in amount such as to give a concentration of 4.0 grams of lead per gallon of fuel.

Fluid and fuel compositions are also made up in which the scavenger content is composed of compositions such as 0.1 theory of bromine as 2,5-dibromo-2,5-dimethylhexane, 0.15 theory of bromine as tertiary butylbromide, 0.1 theory of chlorine as 3,5-dichloroheptane, 0.5 theory of bromine as diethyldibromomalonate, and 0.15 theory of bromine as 1-bromoethanol. Mixtures of any combination of two or more of these types of scavengers can also be used with better results in scavenging effectiveness being achieved than when the compound of this invention is not included.

The scavenging efficiency of the halohydrins of this invention is demonstrated by the high deposit removal observed when single cylinder laboratory engines are operated on leaded fuels containing these scavengers. The engines were standard CFR L-head engines operated at full throttle at 900 R. P. M. with a fuel-to-air ratio of 0.082. The fuel was isooctane containing 12.5 ml. of tetraethyllead (13.2 g. of Pb) per gallon together with a scavenger. The amount of fuel consumed per run was 7 lbs., 14 oz. The results obtained are illustrated by the following table. The percent deposit removed is corrected to the values corresponding to 0.75 theory of bromine for bromine compounds and to 1.50 theories of chlorine for chlorine compounds.

*Table*

| Halogen compound | Theories of halogen | Exhaust valve deposit, mg. Pb | Percent deposit removed |
|---|---|---|---|
| Scavengers within this invention: | | | |
| 2-bromoethanol-1 | 0.74 | 26.7 | 87 |
| 1-bromo-2-propanol | 0.74 | 15.0 | 93 |
| 1-bromo-3-propanol | 0.71 | 67.8 | 68 |
| 1,3-dibromo-2-propanol | 0.75 | 29.2 | 83 |
| 2,3-dibromo-1-propanol | 0.70 | 66.2 | 67 |
| 1-bromo-2-hexanol | 0.73 | 12.6 | 93 |
| 2-chloroethanol | 1.49 | 29.0 | 84 |
| 1-chloro-2-hexanol | 1.73 | 32.5 | 76 |
| 2-chloro-3-hexanol | 1.53 | 6.0 | 94 |
| 1,1,1-trichloro-2-methyl-2-propanol | 1.51 | 64.8 | 64 |
| Scavengers not within this invention: | | | |
| Ethylene dibromide | 0.75 | 89.6 | 50 |
| 1,1-dibromoethane | 0.76 | 88.0 | 51 |
| 1-bromododecane | 0.77 | 96.6 | 46 |
| Ethylene dichloride | 1.50 | 92.0 | 49 |
| 1,3-dichloropropane | 1.47 | 92.9 | 49 |
| 1-chloro-4-hydroxybutane | 1.46 | 101.0 | 45 |
| No scavenger: Tetraethyllead | 0 | 180.0 | 0 |

A comparison of the deposit removal obtained by employing the scavengers of this invention and the prior art scavengers shows that the compounds of this invention are more than 186 percent as effective as conventional scavengers. The amount of deposit removal observed when 1-bromo-3-propanol was used as a scavenger illustrates that the halohydrins are effective even when there is one carbon atom separating the carbons to which the halogen and the hydroxy groups are attached. However, when the halogen- and hydroxy-bearing carbons are separated by more than one carbon atom, as in 1-chloro-4-hydroxybutane, listed in the table, the deposit removing characteristics of the compound then fall below that of conventional scavengers. Therefore, as stated hereinabove, one of the requirements of this invention is that at least one halogen-bearing carbon and one hydroxy-bearing carbon not be separated by more than one carbon atom. The deposit removing effect observed when 1,1,1-trichloro-2-methyl-2-propanol is used as a scavenger for lead antiknock-containing fuels illustrates that there may be more than one halogen in the molecule and that the ratio of halogen to hydroxy groups need not be restricted to a value of 1:1. This same compound also illustrates that the hydroxy group can be attached to a tertiary carbon atom. The term "tertiary carbon atom" as used herein is defined as a carbon atom which is attached by single bonds to three other carbon atoms.

In addition to the benefits given above upon employing the deposit scavenging compounds of this invention, it is also found that the use of many of these scavengers minimizes the octane requirement increase of engines operated on commercial fuels. This increase in octane requirement is a phenomenon observed as the time of operation of an engine is lengthened. It is due to deposits which are built up in various parts of the combustion chamber with the result that a fuel of a quality higher by several octane numbers is required to provide a performance equivalent to that of a clean engine or combustion zone. The halohydrin scavengers of this invention minimize this octane requirement increase.

The scavengers of this invention may be used with organolead or hydrocarbolead compounds in general. Examples of such compounds, including tetraalkyllead and alkylaryllead compounds other than tetraethyllead are tetrapropyllead, dimethyldiethyllead, methyltriethyllead, diethyldiphenyllead, tetrabutyllead, and the like, as well as mixtures of these compounds. The amount of lead compounds employed will vary from about 0.02 to 13.2 grams of lead per gallon, depending on the engine it is to be used in and the kind of fuel employed.

The antiknock composition of this invention may contain other components besides lead antiknock compounds and the halohydrin compounds. Such other components may be solvents, such as toluene or kerosene, or other hydrocarbons. They may also contain dyes which are often used for purposes of identification of fluids. Likewise, antioxidants such as alkylated phenols and amines, metal deactivators, phosphorus compounds, other antiknock agents such as amines and metal carbonyls, antirust and anti-icing agents, and wear inhibitors may also be added to the antiknock composition or fuel containing the same. In like manner, the fuels to which the antiknock compositions of this invention are added may have a wide variation of composition. These fuels generally are petroleum hydrocarbons and are usually blends of two or more components. These fuels can contain all types of hydrocarbons, including paraffins, both straight and branched-chain; olefins; cycloaliphatics containing paraffin or olefin side chains; and aromatics containing aliphatic side chains. The fuel type depends on the base stock from which it is obtained and on the method of refining.

To compare the effect on exhaust valve life of tetraethyllead-containing fuel containing one theory of ethylene dichloride and 0.5 theory of ethylene dibromide as scavenger with the effect of the same fluid in which part of the ethylene dihalide is replaced with an equivalent amount of halogen in the form of one of the halohydrin scavengers of this invention, tests were run in a single cylinder test engine. This engine, having a displacement of 17.6 cu. in. and a compression ratio of 5.6:1, was operated at 2700 R. P. M. on a fuel-to-air ratio of 0.07 on a fuel consisting of technical isooctane containing 3 ml. of tetraethyllead per gallon. The fuel had a sulfur content of 0.05 percent by weight. An average of a number of tests in which the engine was operated until the exhaust valve failed gave an average valve life of 155 hours when operating on a leaded fuel as described above in which the scavenger consisted of 1.0 theory of chlorine as ethylene dichloride and 0.5 theory of bromine as ethylene dibromide. When, however, the scavenger mixture consisted of 0.5 theory of bromine as ethylene dibromide, 0.75 theory of chlorine as ethylene dichloride and 0.2 theory of chlorine as 1-chloro-2-hexanol, the average exhaust valve life based on three tests was 170 hours, an increase of 15 hours or 9.7 percent as compared to that when the conventional scavenger mixture is employed. When the scavenger mixture consisted of 0.5 theory of bromine as ethylene dibromide, 0.5 theory of chlorine as ethylene dichloride and 0.25 theory of chlorine as 2-chloro-3-hexanol, the average exhaust valve life based on two runs was 197 hours or an increase of 27 percent over that observed when the conventional scavenger mixture was employed. In a third test in which 0.1 theory of bromine as 1-bromo-2-hexanol, 0.4 theory of bromine as ethylene dibromide and 1.0 theory of chlorine as ethylene dichloride were employed as scavengers, the average exhaust valve life on the basis of three tests was 195 hours, or an increase of 25.8 percent when compared to the valve life observed when an equivalent amount of chlorine and bromine are present as the ethylene dihalides. This indicates another advantage that is obtained by the use of the novel halohydrin scavengers of this invention. For example, it can be a straight run or processed hydrocarbon, including thermally cracked, catalytically cracked, reformed fractions, etc. The boiling range of the components of the gasoline can vary from 0 to about 530° F., although the boiling range of the fuel blend is often found to be between an initial boiling point of from about 80° F. to 100° F. and a final boiling point of about 430° F. While the above is true for ordinary gasoline, the boiling range is a little more restricted in the case of aviation gasoline. Specifications for the latter often call for a boiling range from about 82° F. to about 338° F. with certain fractions of the fuel boiling away at particular intermediate temperatures.

The hydrocarbon fuels in which the antiknock agent of this invention can be employed often contain minor quantities of various impurities. One such impurity is sulfur, which can be present either in a combined form as an organic or inorganic compound or as the elemental sulfur. The amounts of such sulfur can vary in various fuels from about 0.003 percent to about 0.30 percent by weight. Fuels containing quantities of sulfur, both lesser and greater than the range of amounts referred to above, are also known. These fuels likewise often contain added chemicals in the nature of antioxidants, rust inhibitors, dyes, and the like.

Having fully described the nature of the improved antiknock fluids and fuels obtained according to this invention, it is not intended that this invention be limited except within the scope of the appended claims.

I claim:

1. An organolead antiknock fluid containing halogenated organic compounds as scavengers wherein at least one mole percent of halogen in the scavengers is present in the form of open chain halohydrin compounds having the formula

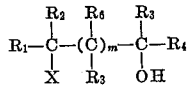

wherein $m$ ranges from 0 to 1; X is a halogen of atomic weight 35–81 and the R's are selected from the group consisting of hydrogen and aliphatic radicals of 1 to 18 carbon atoms, said compound having 2 to 20 carbon atoms, 1 to 4 hydroxy groups and 1 to 6 halogens of atomic weight 35–81, said halohydrin being further characterized in that at least one halogen in each molecule is located on a carbon atom which is not more than two carbons removed from an OH-bearing carbon; the total amount of said halogenated organic compound scavenger ranging from 0.1 to 4.0 theories based on the organolead compound present and the total amount of said halohydrin compound ranging from 0.01 to 2.0 theories based on the organolead compound present; a theory being defined as that amount of scavenger sufficient to provide two atoms of halogen for every atom of lead present.

2. The composition of claim 1 wherein said halohydrin scavenger is a bromohydrin having 2 to 12 carbon atoms and 1 to 6 halogens.

3. The composition of claim 1 wherein said halohydrin scavenger is 1-bromo-2-propanol.

4. A tetraethyllead antiknock fluid containing halogenated organic compounds as scavengers, said scavenger compounds consisting essentially of 0.1 theory of bromine as 1-bromo-2-hexanol, 0.4 theory of bromine as ethylene dibromide, and 1.0 theory of chlorine as ethylene dichloride; a theory being defined as that amount of scavenger sufficient to provide two atoms of halogen for every atom of lead present.

5. A petroleum hydrocarbon fuel of the gasoline boiling range containing the composition of claim 1 in amounts such that the lead content is between about 0.02 and 13.2 grams of lead per gallon of fuel.

6. A petroleum hydrocarbon fuel of the gasoline boiling range containing the composition of claim 1 in amounts such that the lead content is between about 0.02 and 13.2 grams of lead per gallon of fuel and wherein the halohydrin compound is a bromohydrin having 2 to 12 carbon atoms.

7. A petroleum hydrocarbon fuel of the gasoline boiling range containing the fluid composition of claim 4.

References Cited in the file of this patent

UNITED STATES PATENTS

| | | |
|---|---|---|
| 2,178,403 | Muskat | Oct. 31, 1939 |
| 2,214,768 | Lincoln | Sept. 17, 1940 |
| 2,226,787 | Teter | Dec. 31, 1940 |
| 2,281,598 | Prutton | May 5, 1942 |
| 2,504,361 | Van Hartesveldt | Apr. 18, 1950 |

UNITED STATES PATENT OFFICE
CERTIFICATE OF CORRECTION

Patent No. 2,849,304                                          August 26, 1958

Raymond G. Lyben

It is hereby certified that error appears in the printed specification of the above numbered patent requiring correction and that the said Letters Patent should read as corrected below.

Column 10, line 29, for "28.7 parts" read -- 27.8 parts --.

Signed and sealed this 16th day of December 1958.

(SEAL)
Attest:

KARL H. AXLINE                                                ROBERT C. WATSON
Attesting Officer                                         Commissioner of Patents